April 18, 1933.  S. H. FLANNAGAN  1,904,782
REFRIGERATOR WATER COOLER
Filed Dec. 29, 1931
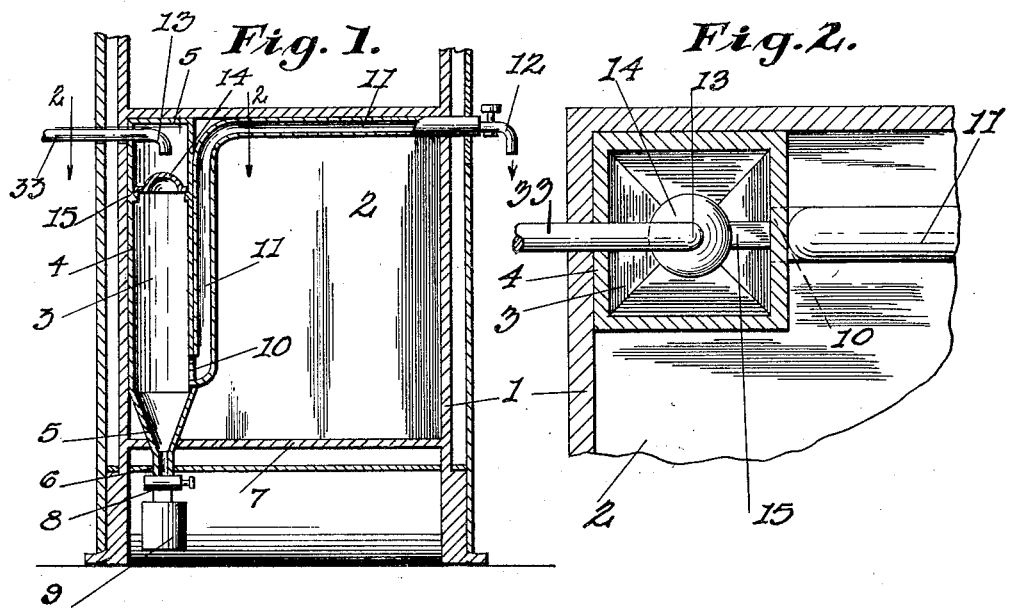
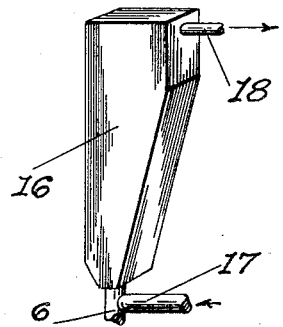
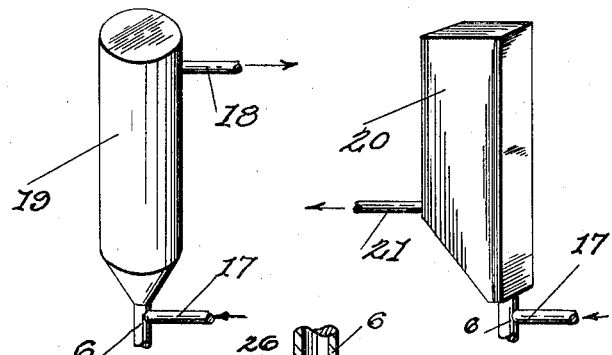
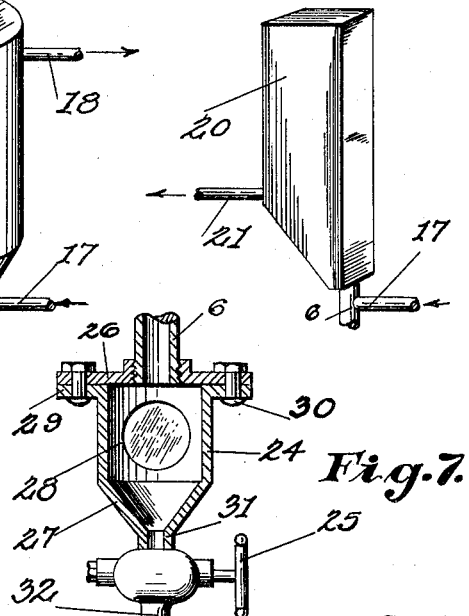
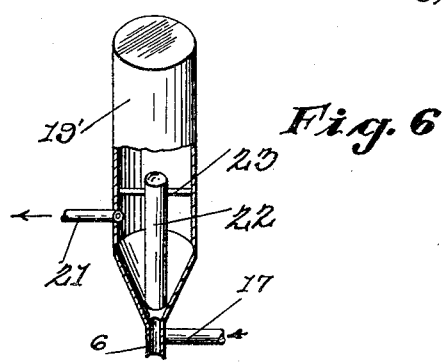
Inventor
Samuel H. Flannagan
By Emery, Booth, Varney & Holcombe
Attorneys Patented Apr. 18, 1933

1,904,782

UNITED STATES PATENT OFFICE

SAMUEL H. FLANNAGAN, OF RICHMOND, VIRGINIA

REFRIGERATOR WATER COOLER

Application filed December 29, 1931. Serial No. 583,761.

My invention aims to provide a combined water-cooler and sediment-free storage tank to be connected to the water supply mains and placed within the food compartment of a refrigerator, so as to afford a continuous supply of cooled water for drinking or other purposes.

One object of my invention is to provide a system having a sufficient cooling rate and storage capacity to supply the sudden and intermittent demands of households and yet which shall interfere to a minimum with the normal use and capacity of refrigerators for cooling foods.

When water from supply mains is cooled and allowed to stand for considerable periods of time, it will be found that substantial amounts of various substances contained in the water in solution will settle out as sediment, owing to their lessened solubility in the cooler medium. If this material is allowed to accumulate in the bottom of the tank for too long a period of time, it will greatly reduce the storage capacity of the tank and will tend to clog the water outlet therefrom and may at times render the outgoing water turbid and undesirable for drinking.

My construction allows the sediment to be continuously removed from the storage tank proper and to be collected in a sediment receptacle which may be conveniently removed for emptying, as the need arises, without interfering with the rest of the system.

The use of cooling coils possesses two chief disadvantages—lack of storage capacity, unless a separate storage tank is used in connection therewith; and difficulty of preventing accumulations of sediment within the coils. In addition, coils cannot be placed in the food compartment of a household refrigerator without unduly interfering with the normal use of such space, and if placed near the chilling means the water within the coils may be cooled to too great an extent, particularly in the case of modern mechanically cooled refrigerators.

My construction makes use of a single vertical tank of moderate cross-section extending substantially the height of the main food compartment and placed out of the way in the rear thereof.

Other objects and advantages of my invention will appear from the following description and claims.

In the accompanying drawing, wherein 1 have shown several embodiments of my invention for purposes of illustration, Fig. 1 shows a central vertical section of one form of apparatus installed in the rear outer corner space of the main food compartment of a refrigerator;

Fig. 2 shows an enlarged horizontal section of the corner space and is taken on the line 2—2 of Fig. 1;

Fig. 3 shows in perspective a second type of tank;

Fig. 4 shows in perspective a modification of the form of tank of Fig. 3;

Fig. 5 shows in perspective a third type of tank;

Fig. 6 shows a part perspective and part sectional view of a modification of the form of tank of Fig. 5; and Fig. 7 shows an alternative form and arrangement of sediment trap and valve, the view being taken vertically, partly in elevation and partly in central section.

In the first embodiment of my invention selected for illustration herein and shown in Figs. 1 and 2 of the drawing, the household refrigerator 1 has within its main food compartment 2 a vertical water tank 3 with square cross-section.

This tank 3 is comprised of vertical side walls 4 and top 5 of a good heat conductive material such as iron or brass. The bottom 5 slopes inwardly at such a pitch as to prevent sediment from sticking thereto and connects with vertical sediment pipe 6 which passes through the floor 7 of the refrigerator and is provided with valve 8 thereunder. Below the valve 8 and connected thereby to the sediment pipe 6, is sediment trap 9, which is preferably made of glass so that the accumulation of sediment therein may be observed. This trap 9 is fastened to the end of the sediment pipe in such a way that it may be easily removed for emptying.

Tank 3 is provided with outlet 10 in its lower side just above the bottom 5. Pipe 11 connects outlet 10 with faucet 12 on the outside of the refrigerator. This pipe is preferably made large enough to constitute a reservoir for chilled water.

Water inlet 13 passes down vertically through the center of the upper part of tank 3 and allows the ingress of water brought by pipe 33 from the mains.

Directly below inlet 13 is an inverted cup 14, spaced from the tank walls by strips 15, which acts as a baffle to break the force of the incoming stream of water, which is thereby directed to the sides of the tank.

The operation of this embodiment of my invention is as follows: The water entering through inlet 13 passes to the sides of the tank and slowly sinks as the heat is absorbed from it through the side walls 4 by the refrigerated space 2. The cooler and denser water will collect in the bottom of the tank and will pass out through outlet 10 whenever cooled water is drawn from faucet 12, such water as remains standing in pipe 11 being maintained at the temperature of the food compartment 2. The tank and pipe 11 will automatically be kept filled at all times since the inlet 13 is connected directly to pressure water mains.

It will be seen that by thus utilizing a long vertical tank and delivery pipe located out of the way in the food compartment, sufficient storage capacity is provided to meet the demands of the household without requiring the tank to be so wide as to interfere with the normal use of the food compartment or to unduly hinder the absorption of heat from the interior of the tank.

The sediment which is precipitated from the cooled water will slowly sink and will pass into sediment pipe 6, without being deposited on the walls or bottom of the tank, and will be collected in sediment trap 9. When trap 9 is observed to be filled with sediment, valve 8 is closed and the trap removed and emptied. It is then replaced and valve 8 opened.

The tank part of the second embodiment of my invention is shown in Figs. 3 and 4. Fig. 3 shows a flat type of vertical tank 16, corresponding to tank 3 of Fig. 3, which is provided with a water outlet 18 near the top and with a sediment pipe 6 at the bottom. The water inlet 17 joins sediment pipe 6, being horizontal so as to prevent sediment from passing into it.

The sides and bottom of tank 16 are either vertical or inwardly sloping so as to form a downwardly diminishing cross-section, ultimately being that of the sediment pipe at the place of joinder. Thus, as in the tank 3 of Fig. 1, the sediment will automatically pass from the tank into the pipe 6.

Fig. 4 shows a tank 19 like that of Fig. 3 except that it has a circular cross-section.

A third type of tank is shown in Figs. 5 and 6, in which the water inlet 17 horizontally enters the sediment pipe 6 and the water outlet 21 is placed in the lower part of the tank side. The outlet 18 is horizontal or upwardly sloping so as to prevent the egress of sediment through it.

In the form of tank 20 shown in Fig. 5, which is of the flat type with rectangular cross-section, the sediment pipe is placed oppositely to the outlet so that the inflowing water will rise into the upper part of the tank. As this water becomes cooled it will slowly sink into that part of the tank away from the inlet and can then be withdrawn through outlet 21 as desired. The purpose of this construction is to keep the incoming water from flowing directly cross to the outlet without having been properly cooled.

Fig. 6 shows a modification of the form just described. Tank 19' has a circular cross-section similar to tank 19 and the sediment pipe is joined at the center of the bottom. Inlet 17 connects with pipe 6, and outlet 21 is placed in the lower part of the side wall, as in the form shown in Fig. 5.

To prevent the direct passage of water from inlet to outlet, a sleeve 22 is supported above the sediment pipe 6 by means of strips 23 which are fastened to the side walls. This sleeve is of slightly greater diameter than the sediment pipe and its lower edge is spaced a short distance above the upper edge of the latter. The sleeve extends into the upper part of the tank and serves to convey incoming water thereto, without preventing sediment from the rest of the tank from descending into the sediment pipe 6.

Fig. 7 illustrates an alternative form and arrangement of sediment trap and valve designed to be secured to the sediment pipe 6 in place of valve 8 and trap 9 shown in Fig. 1.

The lower end of pipe 6 is threaded and secured thereto is a flanged collar 26 which serves as a cover and securing means for a metal sediment receptacle or trap 24 which is provided with a glass window 28. This trap is provided with an upper flange 29 which fits against flanged collar 26 and is secured thereto by bolts 30 so as to form a permanent water tight joint.

Trap 24 is provided with an inwardly sloping bottom 27 which is extended to form a threaded nipple 31 to which is secured valve 25, provided with outlet 32.

This form is particularly applicable where the water in the cooling tank is under considerable pressure, as would be the case where the refrigerator was installed in a lower floor of a high building, in which case a removable trap might cause trouble because of the difficulty of providing a water tight joint. In the present form, when the trap 24 is observed through window 28 to be filled with sediment, valve 25 can be opened and the sediment forced by the water pressure out into a pail or pan placed below outlet 32.

My invention obviously is not restricted to the particular embodiments thereof herein illustrated and described.

Having disclosed several illustrative embodiments, what I claim and desire to secure by Letters Patent is as follows:

1. In combination with a household type refrigerator, a combined water storage and cooling receptacle placed within the main food compartment so as to interfere to a minimum with its normal use, comprising a tall, narrow, closed vertical tank constructed of good heat conductive material and having an inwardly sloping bottom pitched to substantially prevent the accumulation of sediment thereon, a sediment receptacle directly below the lowermost part of the tank and passage means therebetween, a water inlet to the tank, and a water outlet permitting the intermittent withdrawal of cooled water as desired, said tank permitting the cooling and quiescence of the water so as to precipitate out solids.

2. A water storage and cooling receptacle according to claim 1 and having the water inlet near the top of the tank and the water outlet near the bottom.

3. A water storage and cooling receptacle according to claim 1 and having the water inlet at the top of the tank and a baffle plate positioned below said inlet to break the force of incoming water and cause it to flow to the side walls of the tank, and having the water outlet near the bottom of the tank.

4. A water storage and cooling receptacle according to claim 1 and having the water inlet near the bottom of the tank and the water outlet near the top.

5. In combination with a household type refrigerator, a combined water storage and cooling receptacle placed within the main food compartment so as to interfere to a minimum with its normal use, comprising a tall, narrow, closed vertical tank constructed of good heat conductive material and having an inwardly sloping bottom pitched to substantially prevent the accumulation of sediment thereon, said tank permitting the cooling and quiescence of the water so as to precipitate out solids, a sediment receptacle directly below the lowermost part of the tank and connected therewith by a vertical sediment pipe, a water outlet in the lower half of the tank side, a water inlet in the sediment pipe, and a vertical sleeve positioned in the tank with its lower edge just above the juncture of sediment pipe and tank bottom, said sleeve extending substantially above the water outlet so that incoming water will be conducted directly to the upper part of the tank.

In testimony whereof, I have signed my name to this specification.

SAMUEL H. FLANNAGAN.

CERTIFICATE OF CORRECTION.

Patent No. 1,904,782.　　　　　　　　　　　　　　　　　　　　April 18, 1933.

SAMUEL H. FLANNAGAN.

It is hereby certified that error appears in the printed specification of the above numbered patent requiring correction as follows: Page 2, line 51, for "Fig. 3" read "Fig. 1"; and that the said Letters Patent should be read with this correction therein that the same may conform to the record of the case in the Patent Office.

Signed and sealed this 23rd day of May, A. D. 1933.

M. J. Moore.

(Seal)　　　　　　　　　　　　　　　　　　　　　　　Acting Commissioner of Patents.